United States Patent [19]

Okamoto et al.

[11] Patent Number: 4,725,349

[45] Date of Patent: Feb. 16, 1988

[54] PROCESS FOR THE SELECTIVE PRODUCTION OF PETROCHEMICAL PRODUCTS

[75] Inventors: Toshiro Okamoto, Tokyo; Michio Ohshima, Hiroshima, both of Japan

[73] Assignee: Mitsubishi Jukogyo Kabushiki Kaisha, Tokyo, Japan

[21] Appl. No.: 916,363

[22] Filed: Oct. 7, 1986

Related U.S. Application Data

[63] Continuation of Ser. No. 721,698, Apr. 10, 1985, abandoned.

[30] Foreign Application Priority Data

Apr. 13, 1984 [JP] Japan .................................. 59-73022

[51] Int. Cl.$^4$ ............................................. C10G 9/38
[52] U.S. Cl. ..................................... 208/130; 208/72; 208/107; 208/128; 208/129; 585/648; 585/649; 585/650; 585/652
[58] Field of Search ............... 208/107, 128, 129, 130, 208/75, 106; 585/648, 652

[56] References Cited

U.S. PATENT DOCUMENTS

| | | | |
|---|---|---|---|
| 2,698,830 | 1/1955 | Jenny | 208/129 |
| 2,964,551 | 12/1960 | Woolcock | 585/652 |
| 3,419,632 | 12/1968 | Sogawa et al. | 585/652 |
| 3,579,438 | 5/1971 | Cruse | 585/652 |
| 3,718,709 | 2/1973 | Simonetta | 585/652 |
| 4,136,015 | 1/1979 | Kamm et al. | 585/652 |
| 4,271,008 | 6/1981 | Vogt et al. | 585/652 |
| 4,321,131 | 3/1982 | Lowe | 585/648 |
| 4,527,003 | 7/1985 | Okamoto et al. | 585/648 |
| 4,587,011 | 5/1986 | Okamoto et al. | 208/129 |
| 4,599,479 | 7/1986 | Okamoto et al. | 208/129 |
| 4,613,426 | 9/1986 | Okamoto et al. | 585/652 |

Primary Examiner—Curtis R. Davis
Assistant Examiner—Anthony McFarlane
Attorney, Agent, or Firm—Birch, Stewart, Kolasch & Birch

[57] ABSTRACT

A process for the selective production of petrochemical products by thermal cracking is disclosed. The process includes feeding methanol to a thermal cracking atmosphere of hydrocarbons in such a way that the ratio, as carbon atoms, of methanol and at least one starting hydrocarbon is at least 0.05:1, thermally cracking the at least one starting hydrocarbon at a cracking temperature of from 650° to 1300° C., and quenching the resulting reaction product.

12 Claims, 1 Drawing Figure

PROCESS FOR THE SELECTIVE PRODUCTION OF PETROCHEMICAL PRODUCTS

This application is a continuation of application Ser. No. 721,698, filed on Apr. 10, 1985, now abandoned.

BACKGROUND OF THE INVENTION

1. Field of the Invention

The present invention relates to thermal cracking of hydrocarbons and more particularly, to a process for selectively producing petrochemical products such as olefins and aromatic hydrocarbons (hereinafter referred to simply as BTX) by thermal cracking of hydrocarbons.

2. Background of the Invention

The tube-type thermal cracking process called steam cracking is well known and has been heretofore used to convert, into olefins, light gaseous hydrocarbons such as ethane and propane as well as liquid hydrocarbons such as naphtha and kerosine. According to this process, heat is supplied from outside through tube walls, thus placing limits on the heat transmission speed and the reaction temperature. Ordinary conditions adopted for the process include a temperature below 850° C. and a residence time of from 0.1 to 0.5 seconds.

Another process has been proposed in which a tube of a smaller diameter is used to increase the cracking severity and to effect the cracking within a shorter residence time. However, this process is disadvantageous in that because of the small inner diameter, the effective inner diameter is reduced within a short time due to the coking on inner walls. As a consequence, the partial pressure of hydrocarbons increases with an increasing pressure loss in the reactor, causing worse selectivity to ethylene. To avoid this, it is necessary to shorten decoking intervals. This will cause the great disadvantage that because of the reduction of working efficiency of a cracking furnace and also of an increasing number of heat cycles accompanied by the decoking operation, the cracking apparatus is likely to be damaged. In view of the limitation on the apparatus and reaction conditions, starting materials to be cracked are restricted, at most, to gas oils. In other words, the process cannot be applied to heavy hydrocarbons such as residual oils. This is because high temperatures and long reaction times inevitably involve side reactions of polycondensation, so that coking takes place violently and a desired gasification rate cannot be attained, leading to low yields of useful components. It will be noted that the term "gasification rate" used herein is intended to mean a ratio by weight, to an amount of a starting hydrocarbon, of an amount obtained by subtracting $C_5$ and heavier hydrocarbons except for BTX from a hydrocarbon fed to a reaction zone.

Once a starting material is selected, specific cracking conditions and a specific type of apparatus are needed in conformity with the requirements for the single starting material and intended final products. Thus, difficulties are encountered in poor selectivity to starting materials and products with little versatility. For instance, a currently used, typical tube-type cracker is chiefly used for the production of ethylene, so that it is difficult to arbitrarily vary yields of other fundamental chemical products, produced simultaneously, such as propylene, $C_4$ fractions and BTX according to a supply and demand balance. From this, it will be seen that since selectivity to ethylene, which is obtained in high yield by cracking of other substitute starting materials, e.g. heavy hydrocarbons, at high severity, is secured by naphtha, the great possibility of naphtha which is convertible into propylene, $C_4$ fractions such as butadiene and a BTX product is sacrificed. If the yield of ethylene is increased, propylene and $C_4$ fractions irreversibly decrease. This is inevitable in thermal cracking reactions.

Several processes have been proposed for relaxing the limitations placed on both starting materials and final products as discussed above.

In one such process, a liquid hydrocarbon such as crude oil is used as a fuel to generate a hot gas, with which hydrocarbons are thermally cracked under conditions of a pressure of 5 to 70 bars, a reaction temperature of 1315° to 1375° C. and a residence of 3 to 10 milliseconds. In this process, an inert gas such as $CO_2$ or $N_2$ is passed in the form of a film in the direction from the burner for the hot gas toward the reaction zone, whereby coking is suppressed, making it possible to crack heavy oils such as residual oils.

Another process comprises the steps of partially burning hydrogen to give hot hydrogen gas, and thermally cracking various hydrocarbons including heavy oils in an atmosphere of the hot hydrogen gas under conditions of a reaction temperature of 800° to 1800° C., a residence time of 1 to 10 milliseconds, and a pressure of 7 to 70 bars, thereby obtaining olefins. The thermal cracking in an atmosphere having an excess of hydrogen ensures rapid heating, super-short-residence-time cracking, and suppression of coking. In addition, even heavy oils can be cracked. However, this process is disadvantageous in that recycle and separation power for hydrogen, and hydrogen makeup and pre-heating energy impose a considerable economical burden on the process.

These prior art processes need very severe reaction conditions to obtain olefins in high yield from heavy hydrocarbons. As a result, olefins obtained as a final product are mainly composed of $C_2$ fractions such as ethylene and acetylene, with the problem that it is difficult to operate the process so that propylene, $C_4$ fractions and BTX are simultaneously produced in high yields.

The present inventors have made intensive studies to develop thermal cracking processes for producing olefins and particularly $C_3$ and $C_4$ olefins such as propylene and butadiene from a wide variety of hydrocarbons including light to heavy hydrocarbons. As a result, it was found that when methane was fed to a reaction atmosphere, the yields of olefins increased remarkably and selectivities to $C_3$ and $C_4$ olefins also increased. The findings were already proposed in Japanese Patent Application Nos. 57-38684, 58-25797, 58-34928 and 58-41932.

The present inventors have made further studies on the mechanism of methane in the thermal cracking process to significantly improve the yields of products and selectivities to individual products by proper control of the reaction atmosphere for thermal cracking. As a result, we found that when methanol was added to the reaction atmosphere, olefins and BTX could be produced in high yields and high selectivities. The present invention is accomplished based on the above finding.

SUMMARY OF THE INVENTION

Accordingly, it is an object of the present invention to provide a thermal cracking process for producing olefins and BTX from various hydrocarbons in high yields and high selectivities.

It is another object of the present invention to provide a thermal cracking process for hydrocarbons in which methanol is supplied in a thermal cracking atmosphere whereby olefins and particularly, ethylene are produced in large amounts.

According to the present invention, there is provided a thermal cracking process for producing petrochemically valuable products from hydrocarbons, the process comprising feeding methanol to a thermal cracking atmosphere of hydrocarbons in such a way that the ratio, as carbon atoms, of methanol and at least one starting hydrocarbon is at least 0.05:1, thermally cracking the at least one hydrocarbon at a cracking temperature of from 650° to 1300° C., and quenching the resulting reaction product.

BRIEF DESCRIPTION OF THE DRAWING

The sole FIGURE is a flowchart showing part of a thermal cracking process of the present invention when applied industrially.

DETAILED DESCRIPTION AND EMBODIMENTS OF THE INVENTION

Figure 1:
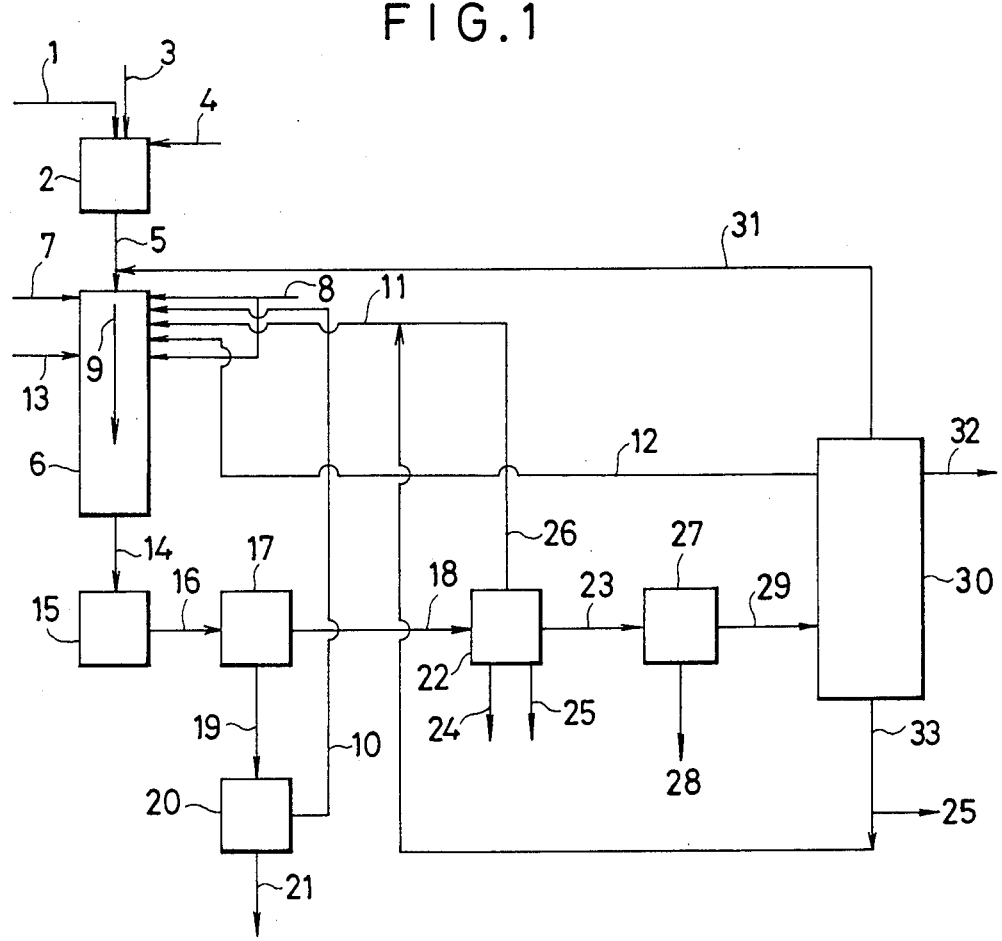

The thermal cracking process of the present invention is described in detail below.

According to the invention, methanol is supplied to a thermal cracking atmosphere of hydrocarbons. In this atmosphere, the supplied methanol is readily cracked into active methyl radicals ($CH_3\cdot$) and OH radicals ($\cdot OH$) in the atmosphere according to the following reaction formula (1)

$$CH_3OH \rightarrow CH_3\cdot + \cdot OH \quad (1)$$

If methanol alone is thermally cracked, part of the produced methyl and OH radicals may be converted into hydrocarbons according to the following radical recombination reaction (2) and the radical chain reactions (3) through (5):

$$CH_3\cdot + CH_3\cdot \rightarrow C_2H_6 \quad (2)$$

$$CH_3\cdot + C_2H_6 \rightarrow C_2H_5\cdot + CH_4 \quad (3)$$

$$CH_4 + OH\cdot \rightarrow CH_3\cdot + H_2O \quad (4)$$

$$C_2H_5\cdot \rightarrow C_2H_4 + H\cdot \quad (5)$$

However, most radicals react with methanol and are converted into CO and $H_2$, for example, according to the following reactions (6) through (9):

$$CH_3\cdot + CH_3OH \rightarrow CH_4 + CH_2OH \quad (6)$$

$$OH\cdot + CH_3OH \rightarrow H_2O + CH_2OH \quad (7)$$

$$CH_2OH \rightarrow HCHO + H\cdot \quad (8)$$

$$HCHO \rightarrow CO + H_2 \quad (9)$$

In the process of the invention, because the atmosphere is rich in hydrocarbons as is different from the case where methanol alone is thermally cracked, there chiefly occur reactions of the radicals, low molecular weight hydrocarbons and $H_2$ produced by the thermal cracking, so that the above reactions (6) through (9) are suppressed to a substantial extent. In a relatively high temperature range over 950° C., $H_2$ and $CH_4$ are activated, for example, according to a series of radical elementary reactions (10) through (15), thereby increasing concentrations of radicals and the cracking speed while the amount of $CH_4$ is reduced and more valuable olefins, particularly ethylene, increase in amounts.

$$CH_4 + OH\cdot \rightarrow CH_3\cdot + H_2 \quad (10)$$

$$H_2 + OH\cdot \rightarrow H\cdot + H_2O \quad (11)$$

$$2CH_3\cdot \rightarrow C_2H_6 \quad (12)$$

$$C_2H_6 + H\cdot \rightarrow C_2H_5\cdot + H_2 \quad (13)$$

$$C_2H_6 + \cdot OH \rightarrow C_2H_5\cdot + H_2O \quad (14)$$

$$C_2H_5\cdot \rightarrow C_2H_4 + H\cdot \quad (15)$$

On the other hand, at relatively low temperatures below 950° C., the methyl radicals formed, for example, by the reaction (1) or (10) readily undergo addition reactions with olefins. The addition reactions involve reduction of $CH_4$ with increasing amounts of $C_3$ and $C_4$ olefins such as propylene, butene and butadiene according to, for example, the following reactions (16) through (20)

$$C_2H_4 + CH_3\cdot \rightarrow C_3H_7\cdot \rightarrow C_3H_6 + H\cdot \quad (16)$$

$$C_3H_6 + CH_3\cdot \rightarrow C_4H_9\cdot \rightarrow C_4H_8 + H\cdot \quad (17)$$

$$C_4H_8 + OH\cdot \rightarrow C_4H_7\cdot + H_2O \quad (18)$$

$$C_4H_7\cdot \rightarrow C_4H_6 + H\cdot \quad (19)$$

$$H\cdot + OH\cdot \rightarrow H_2O \quad (20)$$

In the practice of the present invention, methanol being fed produces active OH radicals, which withdraw hydrogen from hydrocarbons present in a reactor. By the withdrawal, there are produced active hydrocarbon and hydrogen radicals while methanol itself is converted into methyl radicals. Through the reaction between the hydrocarbon and the OH radicals, methane formation is suppressed and it is possible to increase a yield of ethylene at high temperatures and yields of $C_3$ and $C_4$ olefins at low temperatures.

To effectively utilize the function of methanol in the hydrocarbon atmosphere for producing olefins and BTX, in high yields and high selectivities, from a wide variety of hydrocarbons including light to heavy hydrocarbons, the reactor should preferably be of the inner heating type in which the heat necessary for the reactions is supplied by directly mixing with a hot gas which is generated by burning hydrocarbon with oxygen in the presence of steam. The inner heating enables one to readily attain such a high temperature as will not be achieved by outer heating or heating from outside. In addition, heat generated can be utilized without a loss. The inner heating by combustion of hydrocarbons has been heretofore proposed. In the prior art, it is usual to use, as fuels, gaseous hydrocarbons or cleaning oils such as kerosine. Although a method using heavy oils as fuels has been proposed, it is disadvantageous in that when such oil is burnt, coking and sooting tend to occur, thus requiring circulation of an inert gas such as $CO_2$ or $N_2$ in large amounts.

In the practice of the invention, it is preferred to burn hydrocarbons in steam used at a weight ratio, to the fuel hydrocarbon, as great as 1 to 20:1, including the steam required in the downstream reactor. As a result, coking and sooting can be suppressed by relaxation of burning conditions and the reforming effect of solid carbon with steam. Accordingly, a fuel can be arbitrarily selected from any hydrocarbon ranging from light hydrocarbons such as methane to heavy hydrocarbons such as cracked oils and asphalt. Additionally, hydrogen and carbon monoxide can be used as the fuel.

The feed of oxygen for combustion may be less or greater than the theoretical amount. An excessive feed of oxygen is unfavorable because of the loss of effective components in the reactor located downstream. On the other hand, when the feed of oxygen is less than the theoretical amount, hydrogen which is produced upon burning of hydrocarbons makes up a deficiency of hydrogen in heavy hydrocarbons, so that a gasification rate and yields of olefins increase while suppressing coking.

The added steam can be readily condensed during separation and purification of cracked gases and recovered as is different from other gases such as $CO_2$ and $N_2$, with an attendant advantage that no additional burden is imposed on the purification system.

Hydrocarbons to be fed to the reactor are preferably fed to the reactor in multiple stages having different cracking conditions in conformity with cracking characteristics of the respective hydrocarbons. More specifically, individual hydrocarbons have very different cracking characteristics. In order to obtain a desired composition of products in high yields, the respective starting hydrocarbons should be optimumly cracked.

For instance, for thermal cracking of heavy hydrocarbons having high boiling points, it is important to rapidly heat and vaporize starting heavy hydrocarbons for gasification, and cracking the gaseous hydrocarbon in a gas phase diluted with, e.g., steam, into low molecular weight olefins such as ethylene, propylene, butadiene and the like. This permits a high gasification rate and high yields of olefins and BTX. On the contrary, if a heating speed is not satisfactorily high, polycondensation in liquid phase occurs, thus leading to a very poor gasification rate, and poor yields of olefins and BTX.

For the production of olefins from starting heavy hydrocarbons, the hydrocarbons should preferably be rapidly heated by direct contact with a hot combustion gas by the use of the inner heating-type reactor and thermally cracked at high temperatures.

Such thermal cracking at high temperatures enables one to achieve a high gasification rate of heavy hydrocarbons, but $C_3$ and $C_4$ olefins such as propylene, butene, butadiene and the like are cracked into ethylene and methane. Thus, an amount of methane by-product increases and selectivity to ethylene becomes very high.

On the other hand, with low boiling point, light hydrocarbons, they are readily gasified under mild or arbitrary thermal cracking conditions. A significantly high gasification rate is attained even at low temperatures as compared with the case of heavy hydrocarbons. In addition, yields of $C_3$ and $C_4$ olefins, such as propylene and butadiene, increase as compared with a decrease of ethylene.

The temperature of the reaction fluid after thermal cracking of heavy hydrocarbons slightly decreases due to the absorption of heat by the thermal cracking of the heavy hydrocarbon, but is still maintained at a high level. When this reaction fluid is brought into direct contact with light hydrocarbons, the heat energy used to accelerate the thermal cracking of the heavy hydrocarbon can be effectively recovered, and products from the heavy hydrocarbon can be quickly cooled by absorption of heat involved by the thermal cracking of light hydrocarbons.

As described above, the thermal cracking of heavy hydrocarbons results in a high content of ethylene and the thermal cracking of light hydrocarbons involves high selectivities to $C_3$ and $C_4$ olefins and BTX. If these different modes of thermal crackings are combined, it is possible to produce selectively desired olefins and BTX in high yields.

In the multistage cracking, it is preferred that light paraffin gases, such as ethane and propane, produced by the thermal cracking, and cracked oils are fed to positions of the reactor which are, respectively, determined depending on the cracking characteristics thereof. Consequently, a high gasification rate can be attained.

Recycle of cracked oils to the same reactor has been heretofore proposed, but such prior art comprises feeding the cracked oils to the same position as a starting material and cracking them under the same cracking conditions. In this process, little improvement of the yield can be expected. Where, for example, a cracked oil without hydrogenation is fed to the same position as a virgin material, the virgin material which is more likely to crack is preferentially cracked. The cracked oil merely suffers a heat history and is converted into heavy oil by a polycondensation reaction. In the multistage cracking, such a cracked oil is fed to a higher temperature side than a virgin material, where it is thermally cracked. Thus, the cracked oil can be reused as a starting material.

In the practice of the invention, the effects of methanol are shown very effectively in the multistage cracking process. When methanol is fed to the reaction atmosphere of high temperatures over 950° C., it is converted into methyl and OH radicals, which contribute to suppress formation of methane and increase the yield of ethylene. Moreover, an excess of hydrogen evolves in the form of hydrogen molecules or hydrogen radicals, which make up hydrogen relatively deficient in heavy hydrocarbons, thus resulting in a high gasification rate and high yields of olefins (particularly, ethylene).

On the other hand, in an atmosphere of low temperatures below 950° C., methyl radicals ($CH_3$.) from the upstream high temperature zone act on olefins to remarkably increase the yields of $C_3$ and $C_4$ olefins such as propylene and butadiene. As will be understood from the above, ethylene is predominantly produced in the high temperature zone, whereas propylene and higher olefins are produced in the low temperature zone. Thus, arbitrary olefins and BTX can be produced from arbitrary hydrocarbons in high yields and high selectivities.

Part of methanol being fed is converted, in the above thermal cracking atmosphere, into CO and $H_2$ according to the reactions (6) through (9). These gases can be effectively utilized as a hydrogen source necessary for gasification of heavy hydrocarbons.

Methanol is very effectively utilized in a multistage cracking reactor of the inner heating type. The effects of methanol may be similarly shown in existing tube-type cracking furnaces and other inner heating-type reactors. For instance, if a starting material is limited to light hydrocarbons such as naphtha, feed of methanol to existing tube-type cracking furnaces permits an increasing degree of freedom, as will not be experienced in the prior art, with respect to the composition of final product. Instead of using the multistage cracking reactor, the thermal cracking may be effected by dividing a reactor into a plurality of sections.

Aside from steam and methanol, the reaction atmosphere should preferably contain hydrogen and methane. This is because hydrogen has the effect of promoting thermal cracking of heavy hydrocarbons as described below. Hydrogen has higher thermal conductivity than other substances and promotes thermal transmission of from the hot gas to heavy hydrocarbons. As a result, rapid heating and temperature rise, which is important for thermal cracking of heavy hydrocarbons, is expedited. Hydrogen serves to suppress polycondensation reaction by hydrogenation and can permit accelerated gasification by making up, from outside, hydrogen which is deficient to heavy hydrocarbons relative to the carbon content. Thus, light gases are produced in increasing amounts. Hydrogen also has the effect of increasing a concentration of radicals in the reaction system, resulting in high cracking and gasification rates. The effects of hydrogen are more pronounced under higher temperature and pressure conditions. Hydrogen is particularly useful for the thermal cracking of heavy hydrocarbons.

Although the addition of hydrogen alone can increase a gasification rate, the hydrogenation reaction proceeds excessively at the same time. This leads to the conversion of once formed olefins into methane, with the problem that selectivities to olefins lower. If, however, methanol coexists as in the present invention, the reactions (10) through (20) and a reaction (21) of the conversion of hydrogen radicals into methyl radicals proceed, thereby suppressing hydrogenation and increasing yields of ethylene and propylene:

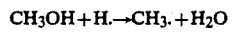

Accordingly, while a high gasification rate which is one of the advantages produced by hydrogen is maintained, selectivities to olefins increase.

When methane is further added, the concentration of methyl radicals in the system further increases according to the reaction (10), which in turn increases the yields of olefins according to the reactions (12) through (19). Similar effects are obtained when substances, such as dimethyl ether, capable of radily producing methyl radicals by thermal cracking, are fed to the reaction system either singly or in combination with methanol or methane.

If the reaction temperature is as low as 650° C. or below, the thermal cracking velocity of hydrocarbons is very small. On the other hand, when the temperature exceeds 1300° C., the formation reaction of CO from OH radicals produced by the cracking of methanol proceeds considerably. Thus, the temperature should preferably be from 650° to 1300° C. The residence time depends on the cracking temperature, i.e. high temperatures result in shorter residence times. Generally, the residence time is within a range of from 5 to 500 milliseconds. As described before, the present invention is based on the finding that methanol is cracked, in a thermal cracking atmosphere for hydrocarbons, into reactive methyl and OH radicals. The radicals act on hydrocarbons so that ethylene is selectively produced at temperatures higher than 950° C., whereas $C_3$ and $C_4$ olefins such as propylene, butadiene and the like are predominantly produced at temperatures lower than 950° C. Thus, hydrocarbons are thermally cracked in an atmosphere where methanol is suitably supplied according to an intended composition of the final product. As a result, the limitations placed on the type of starting material and the final product are mitigated to a greater extent than in the prior art, making it possible to use heavy hydrocarbons as starting materials.

The process of the present invention is more particularly described with reference to the accompanying drawing, which illustrates an industrial application of the process of the invention by way of explanation only.

In the drawing, a fuel hydrocarbon 1 is fed to a combustion zone 2. To the combustion zone 2 is further fed oxygen 3, in which the fuel hydrocarbon 1 is burned in the presence of steam fed from a line 4, thereby generating a hot combustion gas stream 5 of 1300° to 3000° C. The steam may be fed singly or along reactor walls to protect the reactor walls of the combustion zone 2 and suppress coking.

The hot combustion gas stream 5 fed from the combustion zone 2 is mixed with hydrogen and methane fed from a line 31 and pressed into a reaction zone 6. To the reaction zone 6 are first fed a virgin heavy hydrocarbon 7 whose main component has a boiling point over 350° C., e.g. asphalt, and methanol 8, which are directly contacted and mixed with the hot combustion gas stream 5 and are rapidly heated and cracked. As a result, a reaction fluid 9 comprising a major proportion of olefins and particularly ethylene is produced.

Next, the hot reaction fluid 9 is brought into contact with hydrocarbons, including a high boiling cracked oil 10 (boiling point: 220° to 530° C.), cracked gasoline 11 ($C_5$—200° C.), light paraffin gases 12 such as ethane, propane, butane and the like, and like hydrocarbons 13 having boiling points below 350° C., which are successively fed to the reactor. The hot reaction fluid 9 is also contacted with the methanol 8 which is fed in a stepwise manner. These hydrocarbons are successively thermally cracked upon the contact. At the same time, the reaction fluid 9 is, in turn, cooled and thus the heat energy initially supplied to the combustion zone 2 is effectively utilized.

The reaction fluid 14 discharged from the reaction zone 6 is charged into a quenching device 15 in which it is rapidly cooled for heat recovery. The quenching device 15 may be, for example, an indirect quenching heat exchanger in which heat exchange is effected by passing two fluids through the inside and outside of a pipe, respectively.

The reaction fluid 16 discharged from the quenching device 15 is passed into a gasoline fractionator 17 in which it is separated into a cracked gas and steam 18, and a cracked residue (220° C.+) 19. The separated cracked residue 19 is passed into a distillation device 20 and separated into a fuel oil 21 (530° C.+) and a high boiling cracked oil 10. The high boiling cracked oil 10 is recycled to a position downstream of the feed position for the virgin heavy hydrocarbon 7 and re-cracked.

On the other hand, the fuel oil 21 is used as a heat source for the process steam or the fuel 1 fed to the combustion zone 2. The cracked gas and steam 18 are fed to a high temperature separation system 22, by which it is separated into a cracked gas 23, process water 24, BTX 25, and a cracked gasoline 26 obtained after separation of BTX 25. The cracked gas 23 is passed into an acidic gas separator 27 in which $CO_2$ and $H_2S$ 28 are removed therefrom, and is introduced through a line 29 into a product separation and purification device 30. In the product separation and purification device 30, the gas from the separator 27 is separated into hydrogen and methane 31, olefins 32 such as ethylene, propylene, butadiene and the like, light paraffin gases 12 such as ethane, propane, butane and the like, and $C_5$ and heavier components 33. Of these, hydrogen and methane 31 may be withdrawn as fuel, but are usually fed, after conversion of contained CO into hydrogen, if necessary, to the feed position of the heavy hydrocarbon 7 in the reaction zone 6 or an upper portion thereof. The light paraffin gases 12 may be passed to a reaction zone having an intermediate temperature range of from 850° to 1000° C. to obtain ethylene, propylene and the like in high yields, or may be fed to the feed position of the hydrogen and methane. In the latter case, the gases 12 also serve as hydrogen-yielding gases for heavy hydrocarbons. The $C_5$ and heavier components 33 are recycled between the high boiling cracked oil 10 and the light hydrocarbon 13 along with the cracked gasoline 26 obtained after separation of BTX 25 through a line 11 and re-cracked.

The fuel hydrocarbon 1 is not critical, and may be selected, aside from the above-mentioned cracked residue, from a wide variety of substances including light hydrocarbons such as light hydrocarbon gases, naphtha, kerosine and gas oils, and heavy hydrocarbons and various cracked residues such as topped crudes, vacuum residues, heavy oil, shale oil, bitumen, coil-liquefied oils, coal, and the like. Non-hydrocarbons such as CO, $H_2$ and the like may also be used. The type of fuel may depend on an intended process. Fundamentally, however, it is preferred to preferentially use, as the fuel, less valuable substances which are relatively difficult to be converted into valuable products.

The starting heavy hydrocarbon 7 having a boiling point over 350° C. is not critical and includes, for example, petroleum hydrocarbons such as vacuum residues, topped crudes and vacuum gas oils, shale oil, bitumen, coal-liquefied oil, coal, and the like. On the other hand, the light hydrocarbons 13 include paraffinic crude oils and topped crudes as well as LPG, naphtha, kerosine and gas oil. The position where the cracked oil is recycled finally determines the properties of the virgin hydrocarbon and the cracked oil, and the composition of a final product. For instance, when a topped crude is used as the starting heavy hydrocarbon 7, the high boiling cracked oil 10 is preferably fed to a position upstream of the heavy hydrocarbon 7. Alternatively, the high boiling cracked oil 10 may be further separated, for example, into a fraction of 220° to 350° C. and a fraction of 350° to 530° C. and fed to the reaction zone.

In the FIGURE, the effects of methanol are illustrated by way of an embodiment in which a heavy hydrocarbon and a light hydrocarbon are fed in a multistage manner. However, it should be noted that the multistage feeding is not essential in the practice of the invention. The effects of methanol are also shown when the process of the invention is applied to existing cracking furnaces, one-stage inner heating reactors, and combinations of a plurality of reactors. Where starting hydrocarbons are fed in a multiple stages, three or more virgin hydrocarbons may be used, or naphtha may be supplied by two stages without the use of any heavy hydrocarbons.

In the embodiment shown in the FIGURE, methanol is fed in two stages, but the feeding positions and stages should be determined according to the properties of the starting materials, cracking conditions, and an intended composition of final product.

The above embodiment deals with feeding of methane and hydrogen into the reaction atmosphere, but use of the hydrogen and methane is not necessarily essential in the practice of the invention. The reason why hydrogen and methane are used in the above embodiment is as follows: when extremely heavy hydrocarbons such as residues, cracked oils and asphalt are used as the starting hydrocarbon, hydrogen acts very effectively on the cracking reaction as described before, so that when asphalt is used as in the FIGURE, the addition of hydrogen is preferred. When the starting material is a light hydrocarbon alone such as naphtha, hydrogen is not necessarily added. In this case, methanol is also effective for the cracking reaction. With regard to methane, when methane is recycled to the reactor, excessive cracking by hydrogen can be suppressed by the action of methane itself and methanol. In addition, less valuable methane can be converted into more valuable olefins such as ethylene, propylene and the like.

The process of present invention, in which methanol is fed to a thermal cracking atmosphere of hydrocarbons, has the following features and advantages over the prior art.

(1) Methyl and OH radicals produced by the decomposition of methanol act to increase a yield of ethylene at high temperatures and yields of propylene and $C_4$ fractions at low temperatures. As a result, the yield of olefins can be increased as a whole and a composition of final products can be conveniently controlled.

(2) Methane, which is ordinarily utilized as a fuel, can be converted into more active methyl radicals by the presence of methanol, with the result that the radicals can be converted into ethylene in the high temperature zone and into propylene and $C_4$ fractions in the low temperature zone, with an increasing yield of olefins.

(3) In order to maximize a gasification rate of heavy hydrocarbons, thermal cracking must be effected under severe conditions of high temperature and short time. This leads to increasing amounts of methane and ethylene with the attendant problem that product selectivity becomes rigid. According to the present invention, methanol is fed to the reaction atmosphere in multiple stages so as to control the temperature of the atmosphere, whereby a yield of olefins increases and thus the flexibility of the product selectivity increases remarkably. This permits utilization of heavy hydrocarbons as starting materials.

(4) When different cracking characteristics of methanol in low and high temperature ranges are utilized and starting hydrocarbons are cracked in multiple stages in one reactor according to the cracking characteristics so as to optimumly conform to a desired product selectivity, the following effects can be attained.

(1) Energy applied to the reactor for thermally cracking heavy hydrocarbons at high temperatures can be utilized to thermally crack light hydrocarbons being fed downstream, thus drastically lowering the energy unit per unit product.

(2) The produced cracked oil, residue oil residue and by-product gases are fully utilized by thermally cracking the respective components in different stages under different thermal cracking conditions which are completely different from the conditions for virgin materials and which are in conformity with the cracking characteristics of the respective components and requirements for a desired selectivity to the final product. As a consequence, the cracked oil which has been heretofore used only as fuel can be converted into useful components such as BTX, olefins and the like. Thus, it becomes possible to use less valuable materials as starting materials for thermal cracking as was never expected in prior art techniques.

(3) Hydrogen which is produced by thermal cracking of methanol and hydrocarbons mainly composed of light hydrocarbons is recycled to the reactor, by which hydrocarbon deficient in heavy hydrocarbons is made up, leading to a high gasification rate.

(4) Yields of olefins increase remarkably by synergistic effects of increasing yields of propylene and $C_4$ components in a low cracking temperature range for methanol and ethylene at a high cracking temperature range for methanol, and reaction characteristics at the time of multistage cracking of hydrocarbons. Also, a range of selectivity to the product can be greatly extended.

The present invention is described by way of the following examples, which is for illustration only and should not be construed as limiting the present invention.

EXAMPLES

In the examples, a vacuum residue from the Middle East (specific gravity: 1.02, S content: 4.3%, pour point: 40° C.) was used as a fuel and burnt with oxygen in an ordinary burn-type combustor located above the reactor while blowing steam around the inner periphery of the combustor, thereby generating a hot gas comprising steam. Next, hydrogen and methane was blown into the combustor and mixed with the hot gas. The hot gas was then passed into the reactor provided beneath the combustor and was mixed, for thermal cracking, with a starting material and methanol, which were fed from a plurality of nozzles provided on the side walls of the reactor. Thereafter, the reaction product was cooled with water indirectly with the outside and subjected to measurement. The reactor was so designed that cracking conditions could be arbitrarily controlled depending on the type of starting material, i.e. a number of nozzles were mounted on the side wall of the reactor along the direction of the flow of the reaction fluid and thus the feeding position of a starting material was changed depending on the properties of a starting material. The residue time was determined by calculation of the capacity of the reactor and the reaction conditions.

In Table 1, there are shown the results of a case where a Middle East vacuum residue of the same type as used as the fuel was thermally cracked by feeding it to an upper portion of the reactor as a starting material. To accelerate the thermal cracking, the partial pressure of hydrogen was raised to a level of 2 to 3 bars. Table 2 shows the results of a case where Middle East naphtha (boiling point: 40° to 180° C.) was used as a starting material. When the feed of methanol is increased, $C_3$ and $C_4$ components greatly increase in a low temperature side and $C_2$ components increase in a high temperature side. The effects of methanol become pronounced when the ratio, as carbon, of methanol to the starting hydrocarbon exceeds 0.05. Table 3 shows the results of a case where Middle East naphtha as used in Table 2 was used and the cracking temperature was changed. At low temperatures, the cracked speed was low, and little reaction took place at temperatures below 650° C. On the other hand, at temperatures exceeding 1300° C., an amount of formation of $CO+CO_2$ increases, with a loss of the effects of methanol feed. From the above results, the cracking temperature should be preferably in the range of from 650° to 1300° C.

TABLE 1

| Example | 1 | 2 | 3 | 4 | 5 | 6 |
|---|---|---|---|---|---|---|
| Methanol feed (mole/mole of carbon in starting material) | 0 | 0.02 | 0.05 | 0.2 | 0.4 | 0.6 |
| Yield (wt %) | | | | | | |
| $CH_4$ *1 | 35 | 33 | 29 | 21 | 13 | 8 |
| $C_2H_4 + C_2H_2$ | 16 | 17 | 21 | 26 | 32 | 36 |
| $C_2H_6$ | 11 | 10 | 9 | 9 | 9 | 8 |
| $C_3 + C_4$ products | 1 | 3 | 4 | 6 | 7 | 7 |
| BTX | 8 | 7 | 6 | 6 | 6 | 6 |

Cracking temperature: 1000–1200° C.
Residence time: 10–15 milliseconds.

TABLE 2

| Example | 7 | 8 | 9 | 10 | 11 |
|---|---|---|---|---|---|
| Methanol feed (mole/mole of carbon in starting material) | 0 | 0.02 | 0.05 | 0.2 | 0.4 |
| Yield (wt %) | | | | | |
| $CH_4$ *1 | 14 | 13 | 10 | 7 | 4 |
| $C_2H_4 + C_2H_2$ | 28 | 29 | 29 | 27 | 26 |
| $C_2H_6$ | 4 | 3 | 2 | 2 | 2 |
| $C_3$'S | 14 | 15 | 18 | 20 | 22 |
| $C_4$'S | 9 | 9 | 11 | 13 | 15 |
| BTX | 11 | 10 | 9 | 9 | 9 |

Cracking temperature: 750–900° C.
Residence time: about 0.1 second.

TABLE 3

| Example | 12 | 10 | 13 | 14 | 15 |
|---|---|---|---|---|---|
| Cracking temperature (°C.) | 650–800 | 750–900 | 900–1050 | 1100–1300 | 1300–1400 |
| Residence time (milliseconds) | 500 | 100 | 30 | 10 | 5 |
| Yield (wt %) | | | | | |
| $CH_4$ | 5 | 7 | 14 | 20 | 25 |
| $C_2H_4 + C_2H_2$ | 21 | 27 | 33 | 39 | 45 |
| $C_2H_6$ | 3 | 2 | 4 | 5 | 3 |
| $C_3$'S | 16 | 20 | 14 | 7 | trace |
| $C_4$'S | 10 | 13 | 10 | 2 | trace |
| BTX | 6 | 9 | 10 | 12 | 15 |
| $CO + CO_2$ | 3 | 4 | 6 | 10 | 25 |

Methanol feed: 0.2 mole/mole of C in starting material.
*1 In Tables 1 though 3, the yield of $CH_4$ is calculated as derived from a starting hydrocarbon with taking no $CH_4$ from methanol into account.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the selective production of petrochemical products by thermal cracking which comprises the steps of:
    burning hydrocarbons with oxygen in the presence of steam to produce a hot gas having a temperature of from 1300° to 3000° C. comprising steam;
    feeding methanol and starting hydrocarbons to the hot gas so that the molar ratio, as carbon atoms, of methanol to the starting hydrocarbons is at least 0.05;
    further feeding the starting hydrocarbons to the hot gas so that the starting hydrocarbons containing hydrocarbon components of higher boiling points are, respectively, fed to higher temperature zones;
    subjecting the starting hydrocarbons to thermal cracking while maintaining the cracking temperature at 650° C. to 1300° C.; and quenching the resulting reaction product.

2. The process according to claim 1, wherein the steam is used in an amount of 1 to 20 times by weight of the amount of the hydrocarbons which are burned.

3. The process according to claim 2, wherein the oxygen is used in an amount less than the theoretical amount.

4. The process according to claim 1, wherein the starting hydrocarbons are thermally cracked within a residence time of from 5 to 500 milliseconds.

5. The process according to claim 1, wherein said thermal cracking is conducted in a reactor which comprises a high temperature portion which operates at a temperature above 950° C., and a low temperature portion which operates at a temperature below 950° C., and wherein ethylene is predominantly produced in said high temperature portion and olefins having at least three carbon atoms are predominantly produced in said low temperature portion.

6. The process according to claim 5, wherein said olefins having at least three carbon atoms are propylene and butadiene.

7. The process according to claim 1, wherein the starting hydrocarbons are heavy hydrocarbons including a component which has a boiling point over 350° C. and the resulting product contains ethylene.

8. The process according to claim 1, wherein the starting hydrocarbons are light hydrocarbons including a component which has a boiling point over 350° C. and the resulting product is at least one member selected from the group consisting of propylene, butadiene and aromatic hydrocarbons.

9. The process according to claim 1, wherein hydrogen and methane are additionally added to the thermal cracking zone.

10. The process according to claim 1, wherein said petrochemical products are selected from the group consisting of olefins and aromatic hydrocarbons.

11. The process according to claim 1, wherein the starting hydrocarbons are fed to a plurality of different temperature zones of a reactor by a plurality of feed streams so that feed streams containing starting hydrocarbons having higher boiling points are fed to a section of the reactor having higher temperature zones, and feed streams containing starting hydrocarbons having lower boiling points are fed to a corresponding lower temperature zone of the reactor.

12. The process according to claim 1, wherein said starting hydrocarbons have a component whose boiling point exceeds 350° C.

* * * * *